United States Patent
Liu

(10) Patent No.: US 10,618,582 B1
(45) Date of Patent: Apr. 14, 2020

(54) ERECTING DEVICE FOR BICYCLE

(71) Applicant: Che-Lin Liu, Tainan (TW)

(72) Inventor: Che-Lin Liu, Tainan (TW)

( * ) Notice: Subject to any disclaimer, the term of this patent is extended or adjusted under 35 U.S.C. 154(b) by 0 days.

(21) Appl. No.: 16/547,222

(22) Filed: Aug. 21, 2019

(51) Int. Cl.
| | | |
|---|---|---|
| *A47F 7/00* | (2006.01) |
| *B62H 3/00* | (2006.01) |
| *B62H 3/08* | (2006.01) |
| *B62H 3/04* | (2006.01) |

(52) U.S. Cl.
CPC ............. *B62H 3/08* (2013.01); *B62H 3/04* (2013.01)

(58) Field of Classification Search
CPC ... B62H 3/08; B62H 3/06; B62H 3/00; B62H 3/04
See application file for complete search history.

(56) References Cited

U.S. PATENT DOCUMENTS

| | | | | |
|---|---|---|---|---|
| 1,725,181 A | * | 8/1929 | Doering | A47F 7/04 211/24 |
| 5,135,145 A | * | 8/1992 | Hannes | B60R 9/06 224/314 |
| 5,988,402 A | * | 11/1999 | Mayfield | B62H 3/04 211/20 |
| 6,640,979 B1 | * | 11/2003 | Mayfield | B62H 3/00 211/20 |
| 6,755,309 B1 | * | 6/2004 | Runge | B62H 3/04 211/183 |
| 7,878,472 B2 | * | 2/2011 | Lackore | B60R 11/00 211/75 |
| 7,958,973 B2 | * | 6/2011 | Swasand | B60T 3/00 188/32 |
| 8,104,588 B2 | * | 1/2012 | Curlee | B62H 3/08 188/32 |
| 9,610,993 B1 | * | 4/2017 | Ho | B62H 3/08 |
| 9,650,092 B1 | * | 5/2017 | Tsai | B62H 3/04 |
| 10,160,398 B2 | * | 12/2018 | Lee | B60P 3/077 |

FOREIGN PATENT DOCUMENTS

DE 202018004771 U1 * 11/2018 ............... B65H 3/04

* cited by examiner

*Primary Examiner* — Kimberley S Wright
(74) *Attorney, Agent, or Firm* — Alan D. Kamrath; Karin L. Williams; Mayer & Williams PC

(57) ABSTRACT

An erecting device for a bicycle contains at least one mounting, at least one groove, and at least one rotatable connection portion. Two rotatable connection portions are parallelly arranged on each of two ends of the at least one groove, and each of the two rotatable connection portions is rotatably connected with each of multiple dampers. Each clamper has a coupling portion for mating with each rotatable connection portion, a fixing shaft is connected with each rotatable connection portion and the coupling portion, and the fixing shaft is inserted through a resilient element. The resilient element has two first returning segments, each damper has an arcuate face parallel to each rotatable connection portion, and each damper has a receiving portion formed on the arcuate face beside each of two sides of each groove.

2 Claims, 14 Drawing Sheets

ERECTING DEVICE FOR BICYCLE

BACKGROUND OF THE INVENTION

Field of the Invention

The present invention relates to an erecting device to erect a bicycle.

Description of the Prior Art

An erecting stand 10' includes a base 11' fixed on a bottom thereof, a first positioning support 12' and a second positioning support 13' which are connected with the base 11'. The base 11' includes two fixing sheets 112' mounted thereon and includes an arcuate slot 113' defined on the fixing sheet 112'. The arcuate slot 113' is rotatably connected with the first positioning support 12' by using a stop notch 1131', a large-diameter orifice 1132', and a small-diameter orifice 1133'. A rod 114' is defined among a pull shaft 14' and the two fixing sheets 112' and is fitted with a spring 115'. A first end of the spring 115' abuts against the rod 114', and a locking foot 1151' of a second end of the spring 115' is engaged with the first positioning support 12'. A top of the first positioning support 12' is rotatably connected with a first abutting wheel 122'. The second positioning support 13' is rotatably connected on the base 11' and includes a rotatable frame 134' formed on a top thereof and having a first groove 1341' corresponding to the first abutting wheel 122', as shown in FIG. 1.

The erecting stand 10' supports a wheel 20' of a bicycle 2' by mating the first groove 1341' with the first abutting wheel 122'. The wheel 20' includes a metal rim 201' and a rubber rim 202' supported by the metal rim 201'. The rubber rim 202' is inflated with air, expandable, and flexible so that the wheel 20' is fixed between the first groove 1341' and the first abutting wheel 122'. When air is released from the rubber rim 202', the wheel 20' is removed from the first groove 1341' and the first abutting wheel 122', and thus bicycle 2' will fall, as shown in FIGS. 2 and 3. As illustrated in FIG. 4, the air is released from the rubber rim 202'.

The first positioning support 12' is removed from the two fixing sheets 112' by ways of the pull shaft 14' so that the pull shaft 14' is rotated with the first positioning support 12' to engage with the stop notch 1131' via the large-diameter orifice 1132' and the small-diameter orifice 1133'. Alternatively, the pull shaft 14' is rotated with the first positioning support 12' to engage with the large-diameter orifice 1132'. However, the pull shaft 14 has to be operated forcefully to drive the first positioning support 12' to rotate, as illustrated in FIG. 1.

An auxiliary rack 1A' includes a locating frame 13A' which has a second groove 134A' corresponding to a second abutting wheel 12A'. For the second abutting wheel 12A' and the second groove 134A', after releasing air from the rubber rim 202', the wheel 20' has to be removed from the second groove 134A' and the second abutting wheel 12A', and thus bicycle 2' will fall, as shown in FIG. 5. FIG. 4 shows the wheel 20' and the rubber rim 202'.

After releasing the air from the wheel 20', the erecting stand 10' cannot be fixed.

The present invention has arisen to mitigate and/or obviate the afore-described disadvantages.

SUMMARY OF THE INVENTION

The primary objective of the present invention is to provide an erecting device for a bicycle which contains at least one rotatable connection portion rotatably connected with multiple clampers, the multiple dampers having multiple arcuate faces respectively, and multiple receiving portions formed on the multiple arcuate faces individually.

To obtain above-mentioned objective, an erecting device for a bicycle provided by the present invention contains at least one mounting, at least one groove defined inside the at least one mounting, and at least one rotatable connection portion arranged inside the at least one groove and facing a ground.

Two rotatable connection portions are parallelly arranged on each of two ends of the at least one groove, each of the two rotatable connection portions is rotatably connected with each of multiple clampers, and each damper has a coupling portion for mating with each rotatable connection portion. A fixing shaft is connected with each rotatable connection portion and the coupling portion, and the fixing shaft is inserted through a resilient element. The resilient element has two first returning segments. One of the two first returning segments abuts against each rotatable connection portion, and the other first returning segment is biased against a bottom of each clamper. Each damper has an arcuate face parallel to each rotatable connection portion and has a receiving portion formed on the arcuate face beside each of two sides of each groove.

Preferably, the at least one mounting respectively has at least one post, a curved portion formed on an end of each of the at least one post, and two extensions parallelly extending from two ends of the curved portion respectively. Two ends of the two extensions are connected with two stand tubes, and the groove is defined by the two extensions and the two stand tubes. Four holders are connected with the two extensions within the groove, and each rotatable connection portion is arranged on each of the four holders.

Preferably, each of the at least one mounting has a swing rack mounted on an end thereof opposite to the curved portion, each mounting has a first rotatable connector fixed on a first side thereof, and the first rotatable connector has an accommodation chamber defined in a side thereof away from each mounting. The accommodation chamber has an abutting face defined behind the accommodation chamber, and the accommodation chamber accommodates a rotary spring. The rotary spring has a second returning segment for abutting against the abutting face, and the rotary spring also has a third returning segment opposite to the second returning segment. The swing rack includes a first rotatable seat rotatably connected with the first rotatable connector and limited in the accommodation chamber, the first rotatable seat has a contact face defined on an inner wall thereof and contacting with the third returning segment, and the first rotatable seat has a first rotary part. Each mounting is fixed with a second rotatable connector opposite to the first rotatable connector, the second rotatable connector has a housing room configured to a compression spring and a positioning bolt, and the positioning bolt has a press section. The swing rack further includes a second rotatable seat rotatably connected with the second rotatable connector and limiting the housing room, and the rotatable seat has an opening and an arcuate recess. When the swing rack swings forward, the compression spring pushes the press section of the positioning bolt via the opening. When the swing rack swings upward, the compression spring pushes the press section of the positioning bolt via the arcuate recess so that the press section slides in the arcuate recess, and each mounting forces the swing rack forward by using the third returning segment of the rotary spring so that the press section abuts against a bottom of the arcuate recess. The second rotatable seat has a second rotary part, and a stop wheel is rotatably connected between the second rotary part and the first rotary part and corresponds to a center of the groove.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 11:
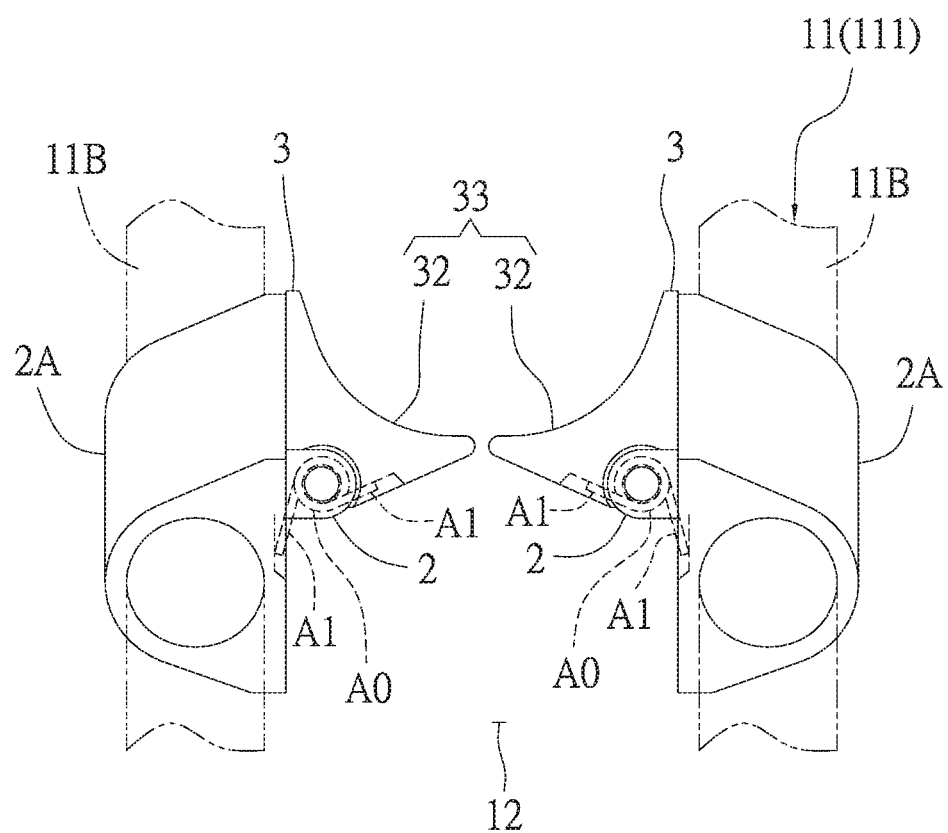
FIG. 11 is another plan view showing the assembly of a part of the erecting device of the bicycle according to the preferred embodiment of the present invention.

An erecting device 1 for a bicycle according to a preferred embodiment of the present invention includes at least one mounting 11, at least one groove 12 defined inside the at least one mounting 11, at least one rotatable connection portion 2 arranged inside the at least one groove 12 and facing a ground. Two rotatable connection portions 2 are parallelly arranged on each of two ends of the at least one groove 12, each of the two rotatable connection portions 2 is rotatably connected with each of multiple dampers 3, and each damper 3 has a coupling portion 31 for mating with each rotatable connection portion 2. A fixing shaft 21 is connected with each rotatable connection portion 2 and the coupling portion 31, and the fixing shaft 21 is inserted through a resilient element A0. The resilient element A0 has two first returning segments A1, one of the two first returning segments A1 abuts against each rotatable connection portion 2, and the other first returning segment A1 is biased against a bottom of each damper 3. Each damper 3 has an arcuate face 32 parallel to each rotatable connection portion 2 and has a receiving portion 33 formed on the arcuate face 32 beside each of two sides of each groove 12, as shown in FIGS. 6, 7 and 11.

The at least one mounting 11 respectively has at least one post 111, a curved portion 11A formed on an end of each of the at least one post 111, and two extensions 11B parallelly extending from two ends of the curved portion 11A respectively. Two ends of the two extensions 11B are connected with two stand tubes 112, and the groove 12 is defined by the two extensions 11B and the two stand tubes 112, wherein four holders 2A are connected with the two extensions 11B within the groove 12, and each rotatable connection portion 2 is arranged on each of the four holders 2A, as illustrated in FIGS. 6 and 7.

Figure 1:
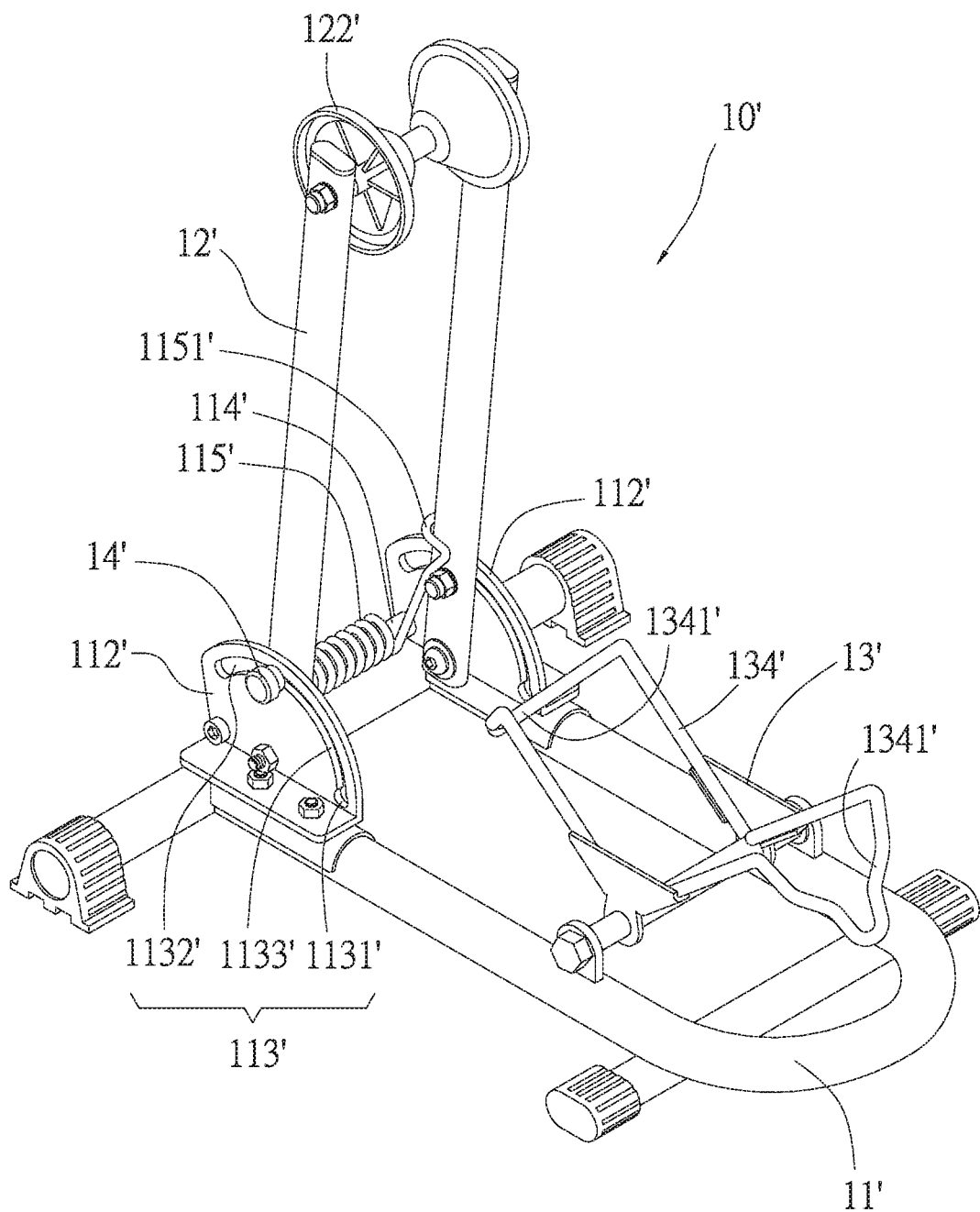
FIG. 1 is a perspective view of a conventional erecting stand.
Figure 2:
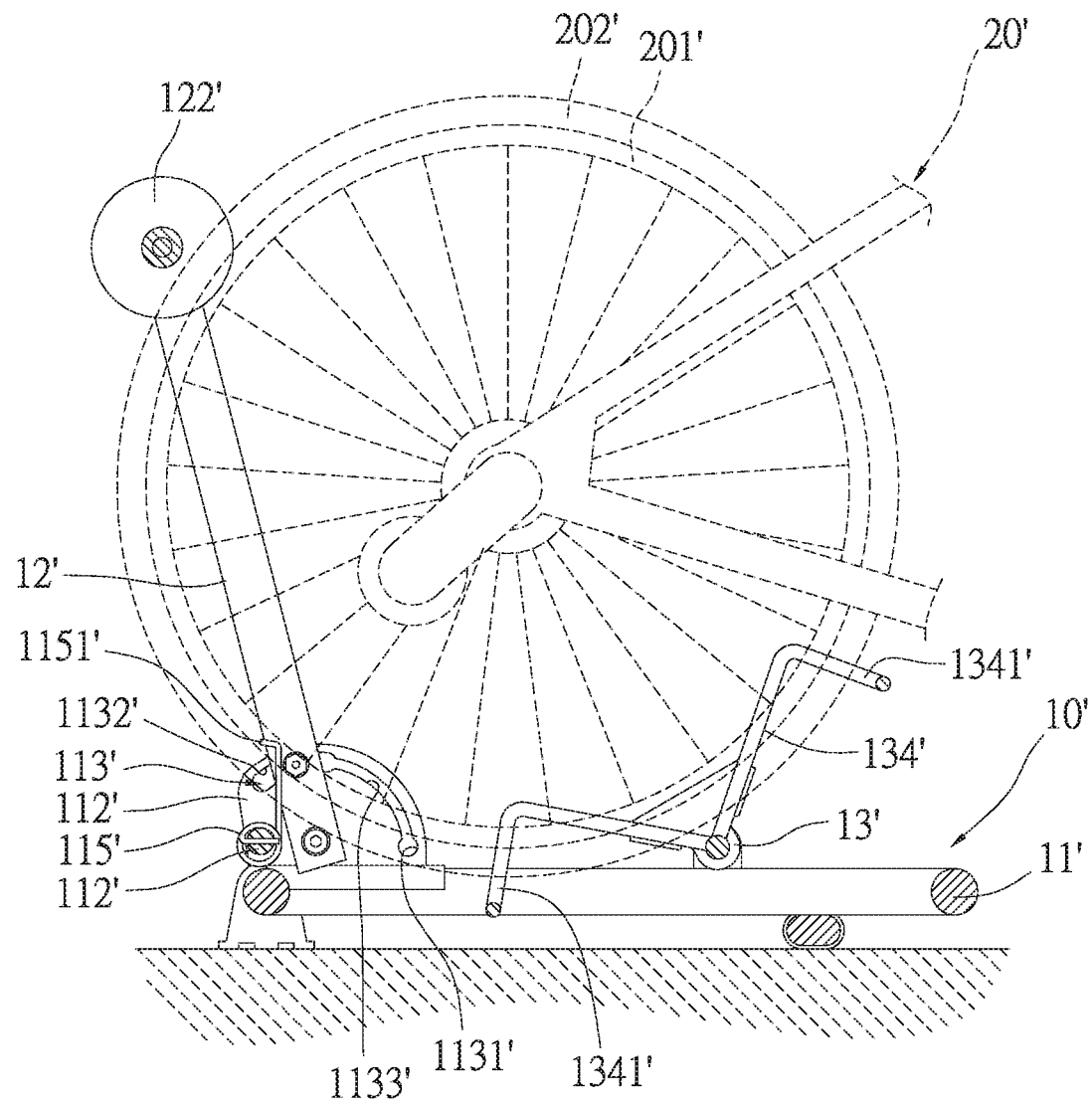
FIG. 2 is a cross sectional view showing a wheel being supported by the conventional erecting stand.
Figure 3:
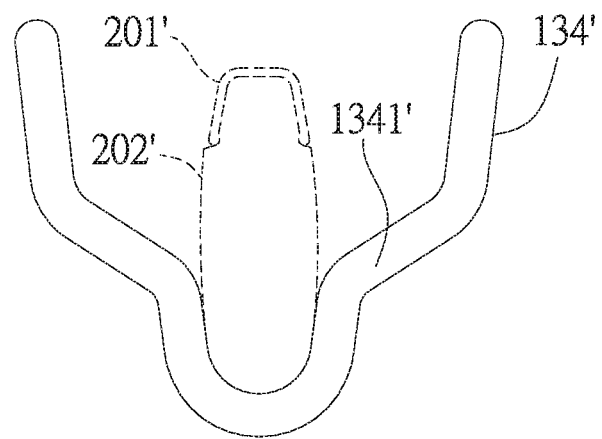
FIG. 3 is a side plan view showing the operation of a part of the conventional erecting stand.
Figure 4:
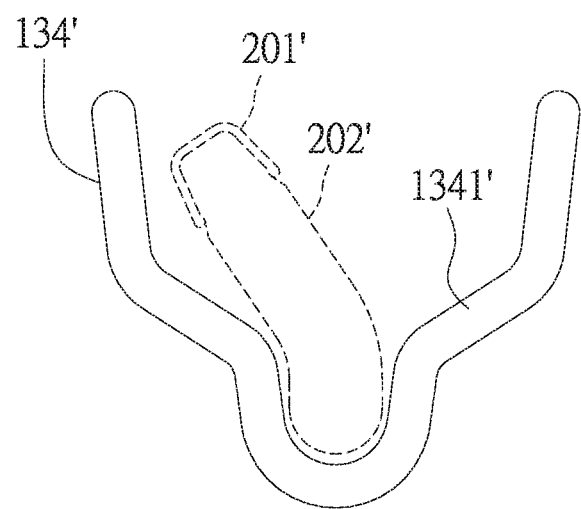
FIG. 4 is another side plan view showing the operation of a part of the conventional erecting stand.
Figure 5:
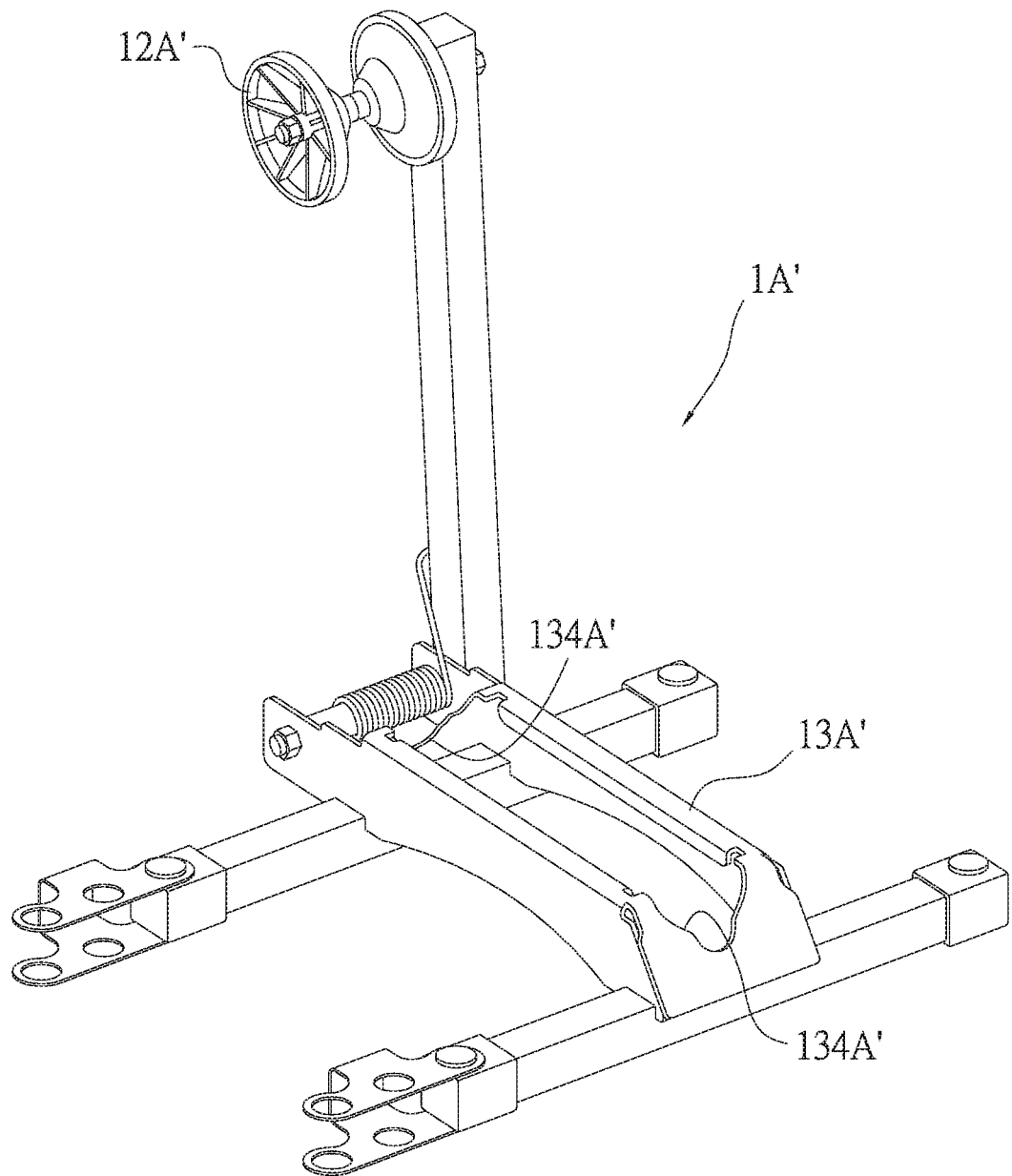
FIG. 5 is a perspective view showing the operation of an auxiliary rack of the conventional erecting stand.
Figure 6:
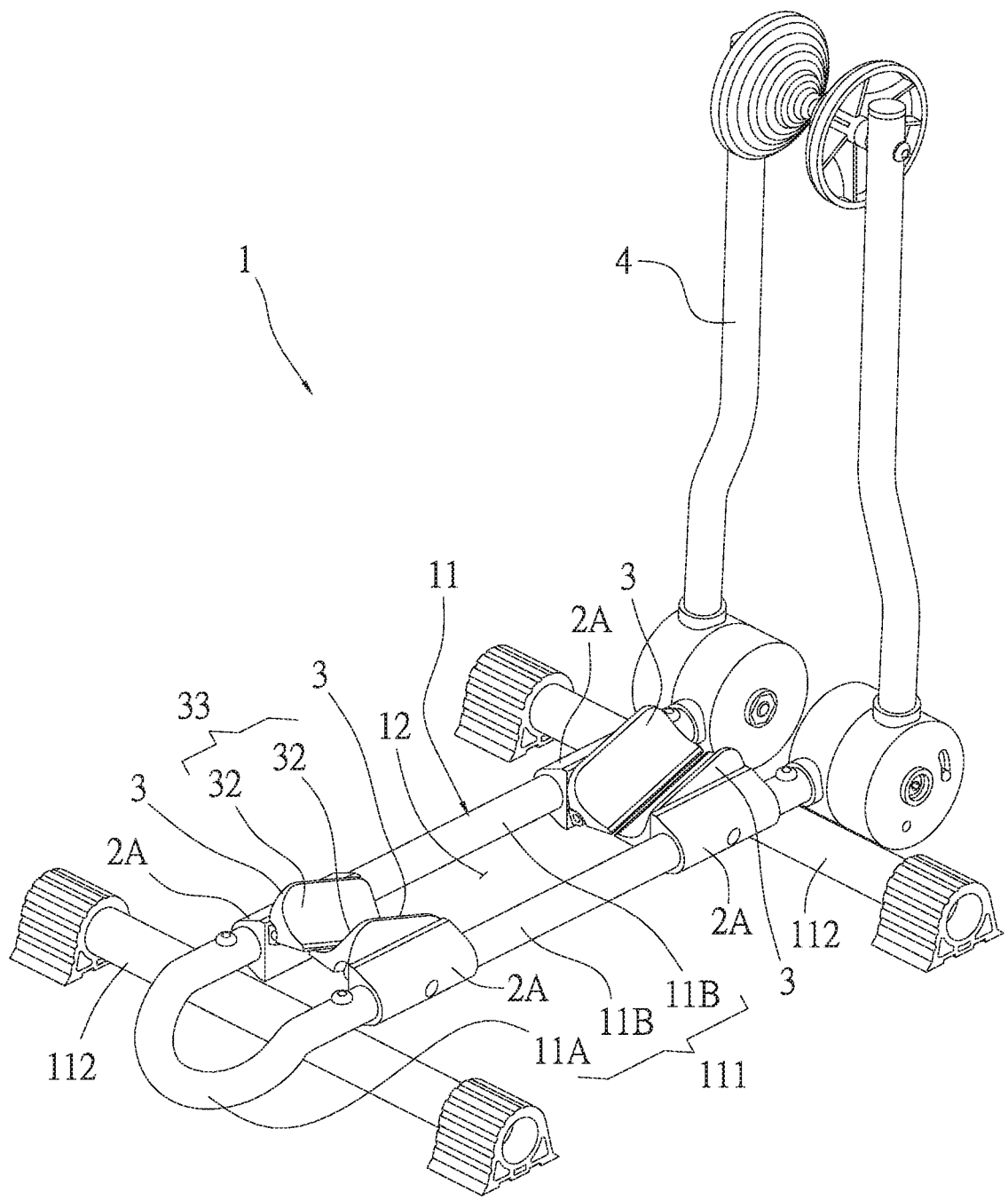
FIG. 6 is a perspective view showing the assembly of an erecting device of a bicycle according to a preferred embodiment of the present invention.
Figure 7:
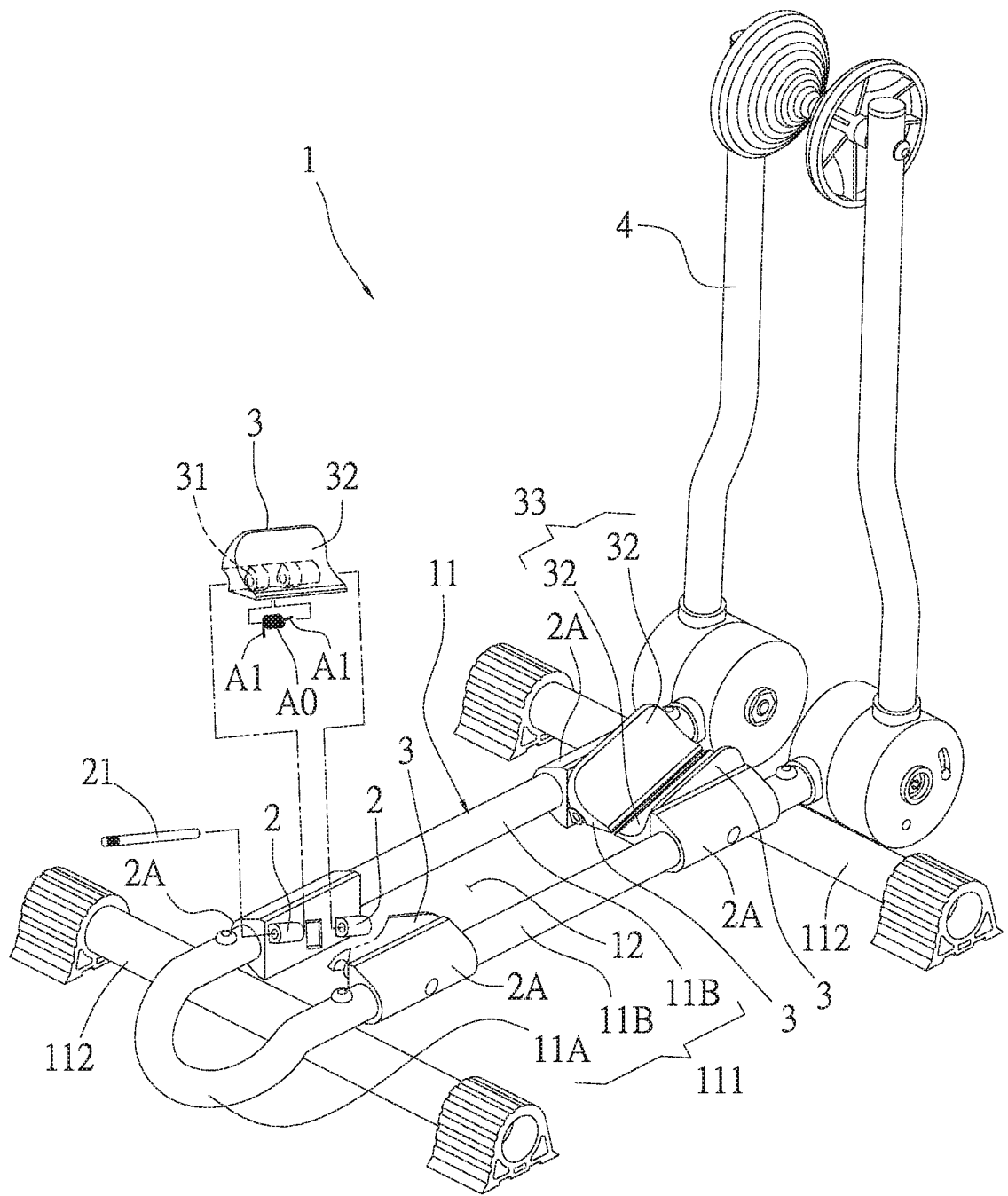
FIG. 7 is a perspective view showing the exploded components of a part of the erecting device of the bicycle according to the preferred embodiment of the present invention.
Figure 8:
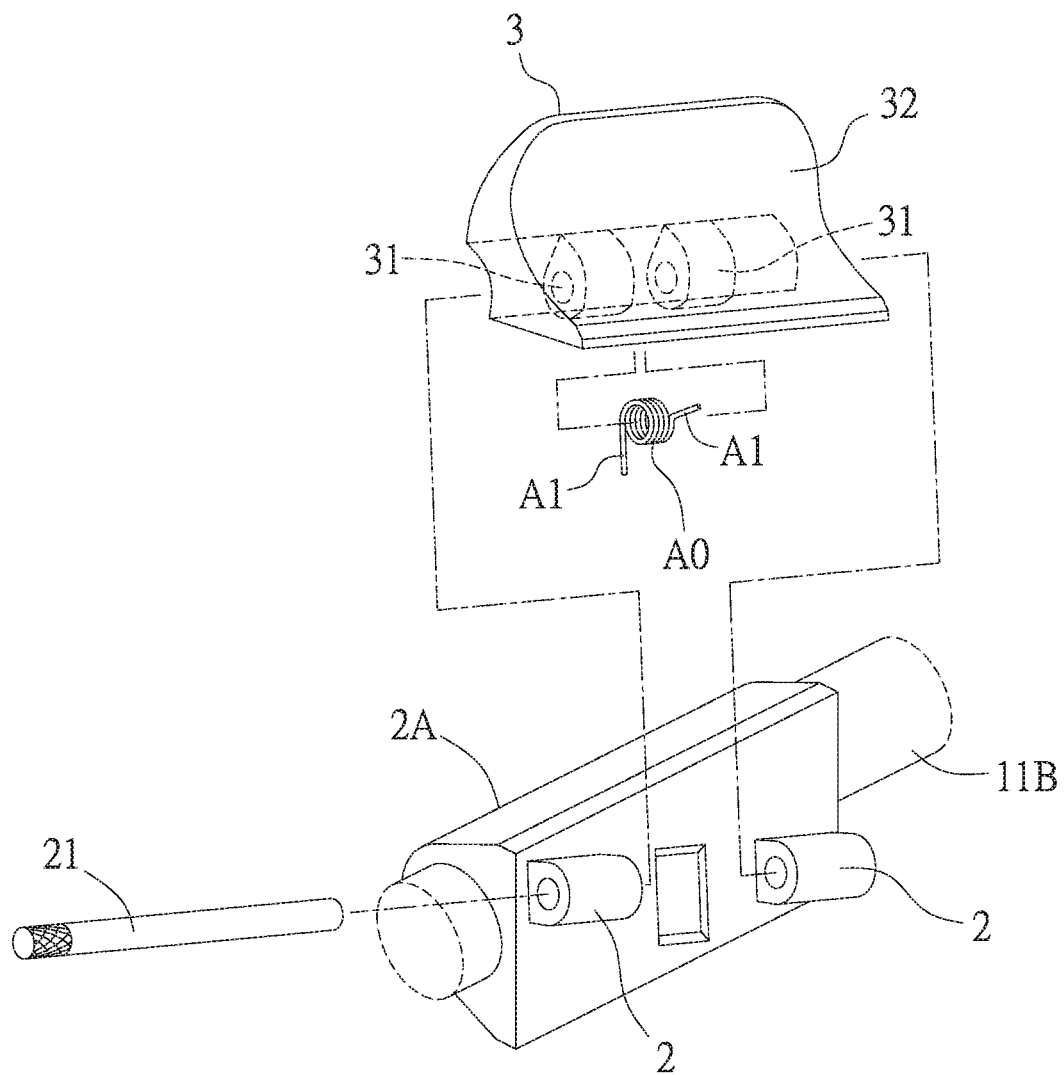
FIG. 8 is a perspective view showing the exploded components of a part of the erecting device of the bicycle according to the preferred embodiment of the present invention.
Figure 9:
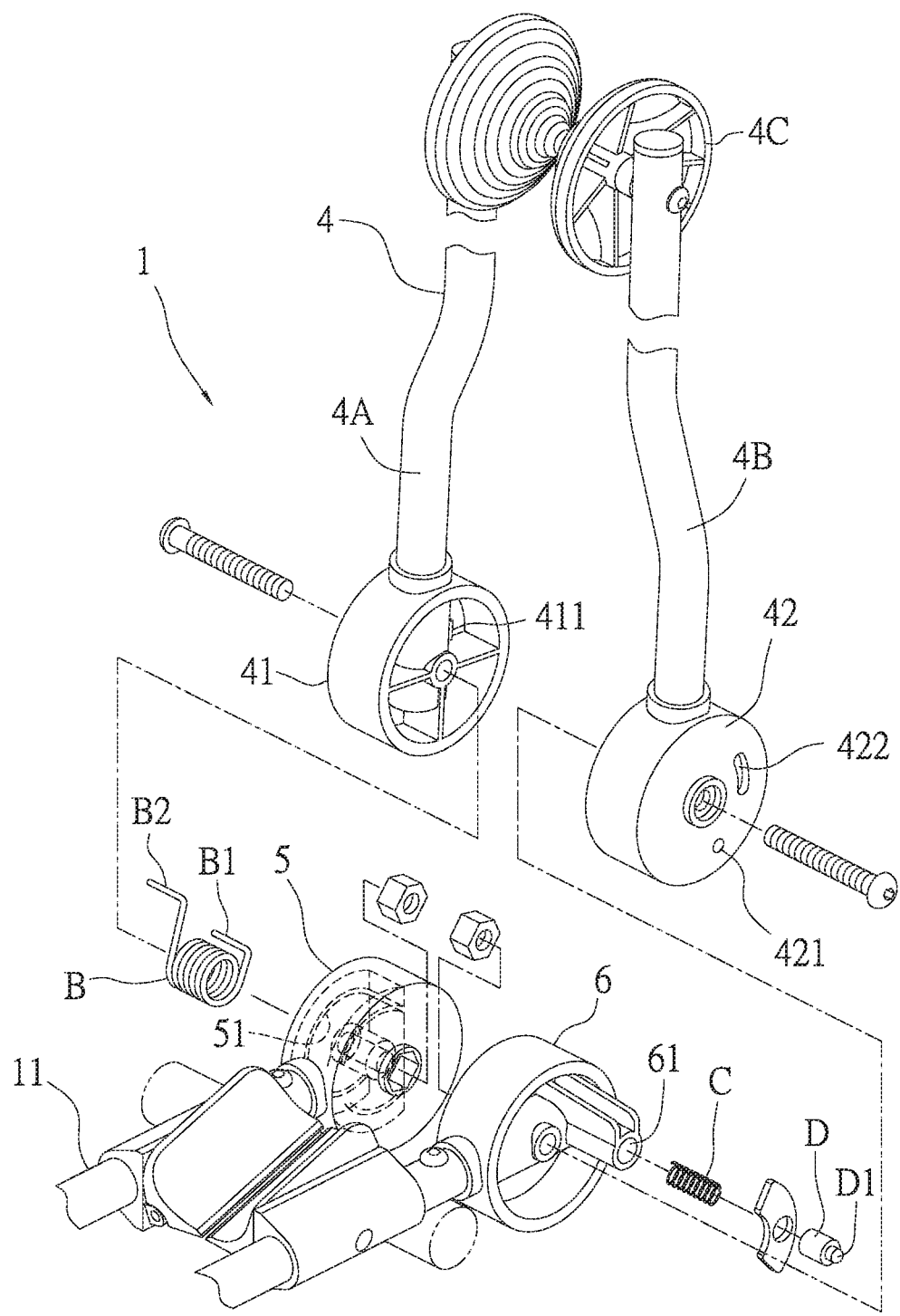
FIG. 9 is another perspective view showing the exploded components of a part of the erecting device of the bicycle according to the preferred embodiment of the present invention.
Figure 12:
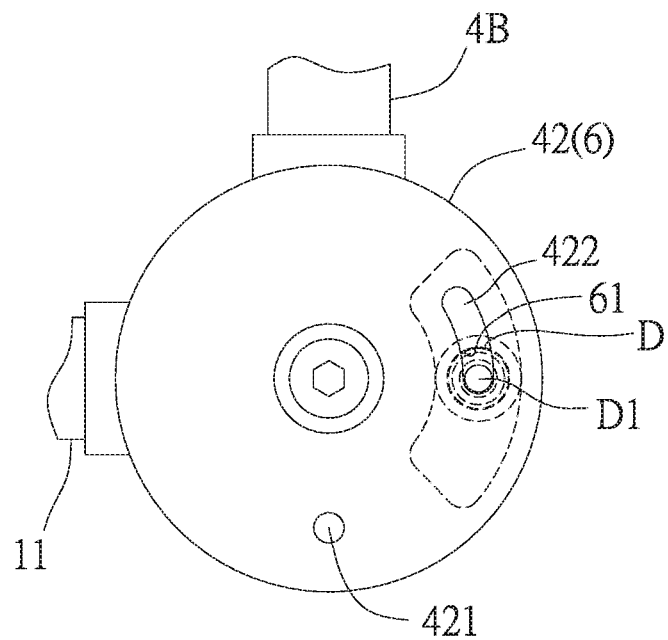
FIG. 12 is also another plan view showing the assembly of a part of the erecting device of the bicycle according to the preferred embodiment of the present invention.
Figure 13:
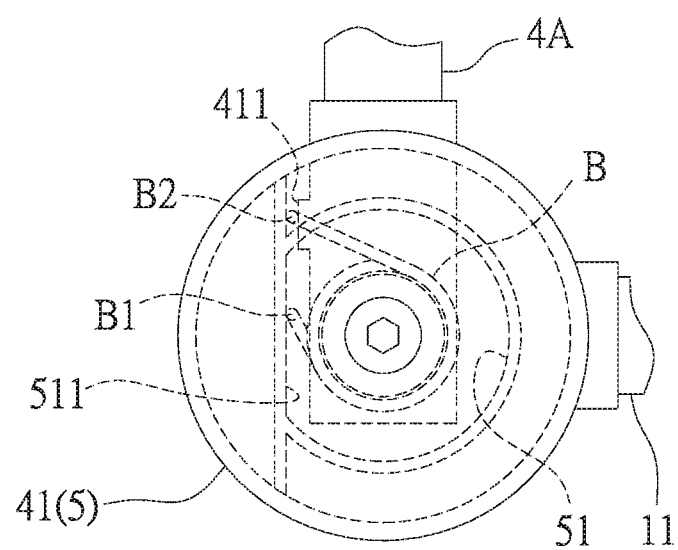
FIG. 13 is still another plan view showing the assembly of a part of the erecting device of the bicycle according to the preferred embodiment of the present invention.

Each of the at least one mounting 11 has a swing rack 4 mounted on an end thereof opposite to the curved portion 11A, as shown in FIG. 6, each mounting 11 has a first rotatable connector 5 fixed on a first side thereof, and the first rotatable connector 5 has an accommodation chamber 51 defined in a side thereof away from each mounting 11. The accommodation chamber 51 has an abutting face 511 defined behind the accommodation chamber 51, and the accommodation chamber 51 accommodates a rotary spring B. The rotary spring B has a second returning segment B1 for abutting against the abutting face 511, and the rotary spring B also has a third returning segment B2 opposite to the second returning segment B1. The swing rack 4 includes a first rotatable seat 41 rotatably connected with the first rotatable connector 5 and limited in the accommodation chamber 51, the first rotatable seat 41 has a contact face 411 defined on an inner wall thereof and contacting with the third returning segment B2, and the first rotatable seat 41 has a first rotary part 4A, as shown in FIGS. 9 and 13. Each mounting 11 is fixed with a second rotatable connector 6 opposite to the first rotatable connector 5. The second rotatable connector 6 has a housing room 61 configured to a compression spring C and a positioning bolt D, and the positioning bolt has a press section D1. The swing rack 4 further includes a second rotatable seat 42 rotatably connected with the second rotatable connector 6 and limiting the housing room 61, and the rotatable seat 42 has an opening 421 and an arcuate recess 422. When the swing rack 4 swings forward, the compression spring C pushes the press section D1 of the positioning bolt D via the opening 421. When the swing rack 4 swings upward, the compression spring C pushes the press section D1 of the positioning bolt D via the arcuate recess 422 so that the press section D1 slides in the arcuate recess 422, and each mounting 11 forces the swing rack 4 forward by using the third returning segment B2 of the rotary spring B so that the press section D1 abuts against a bottom of the arcuate recess 422. The second rotatable seat 42 has a second rotary part 4B, and a stop wheel 4C is rotatably connected between the second rotary part 4B and the first rotary part 4A and corresponds to a center of the groove 12, as illustrated in FIGS. 9 and 12.

Figure 14:
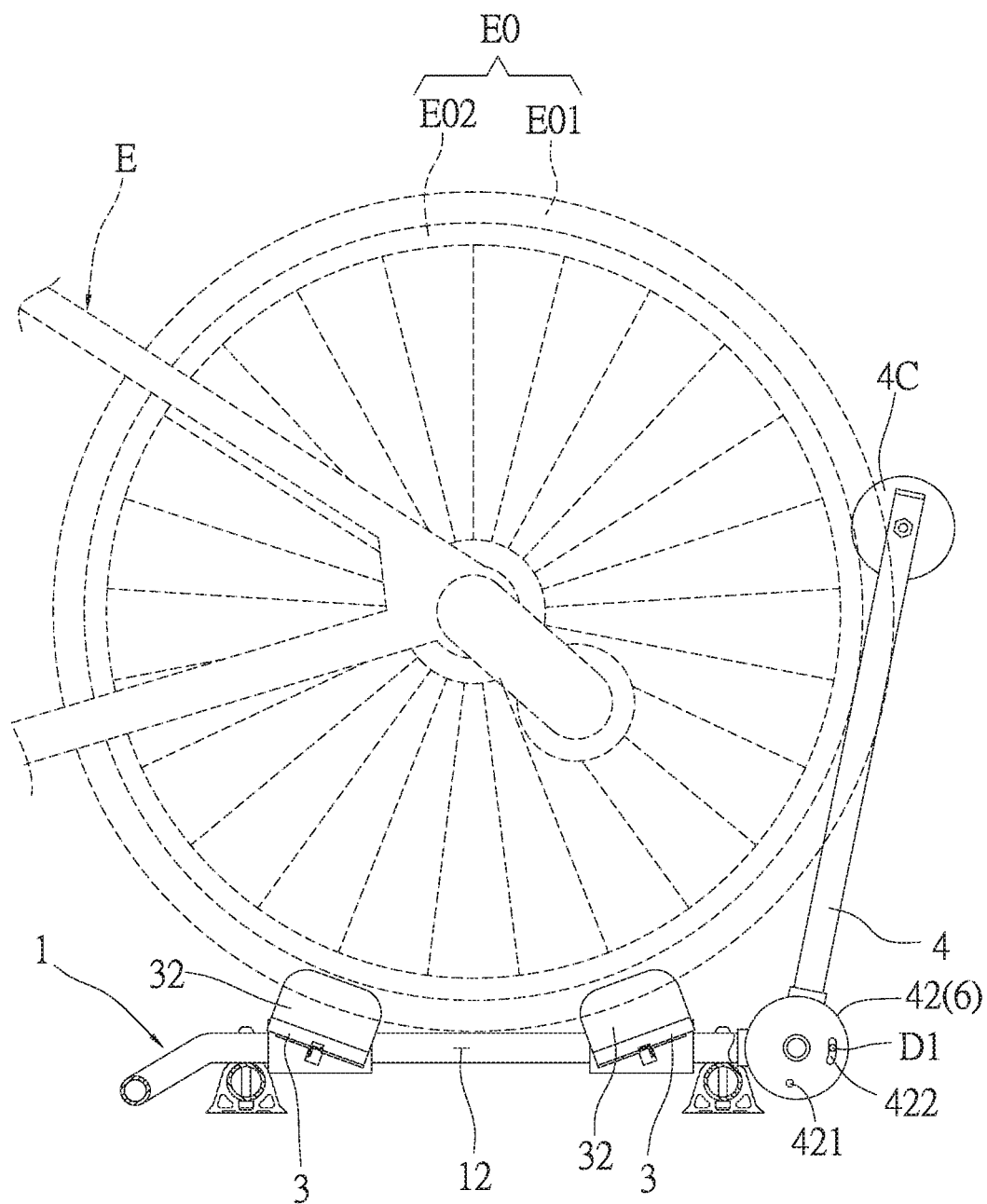
FIG. 14 is a cross sectional view showing the operation of the erecting device of the bicycle according to the preferred embodiment of the present invention.
Figure 15:
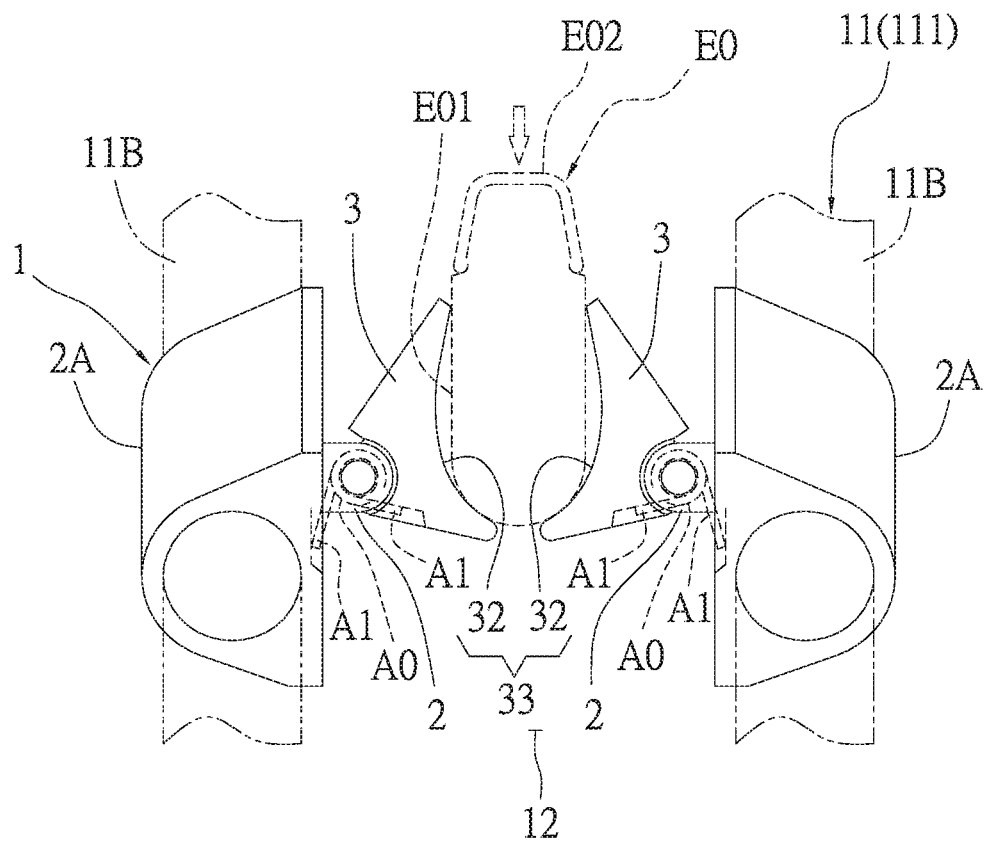
FIG. 15 is a side plan view showing the operation of a part of the erecting device of the bicycle according to the preferred embodiment of the present invention.
Figure 16:
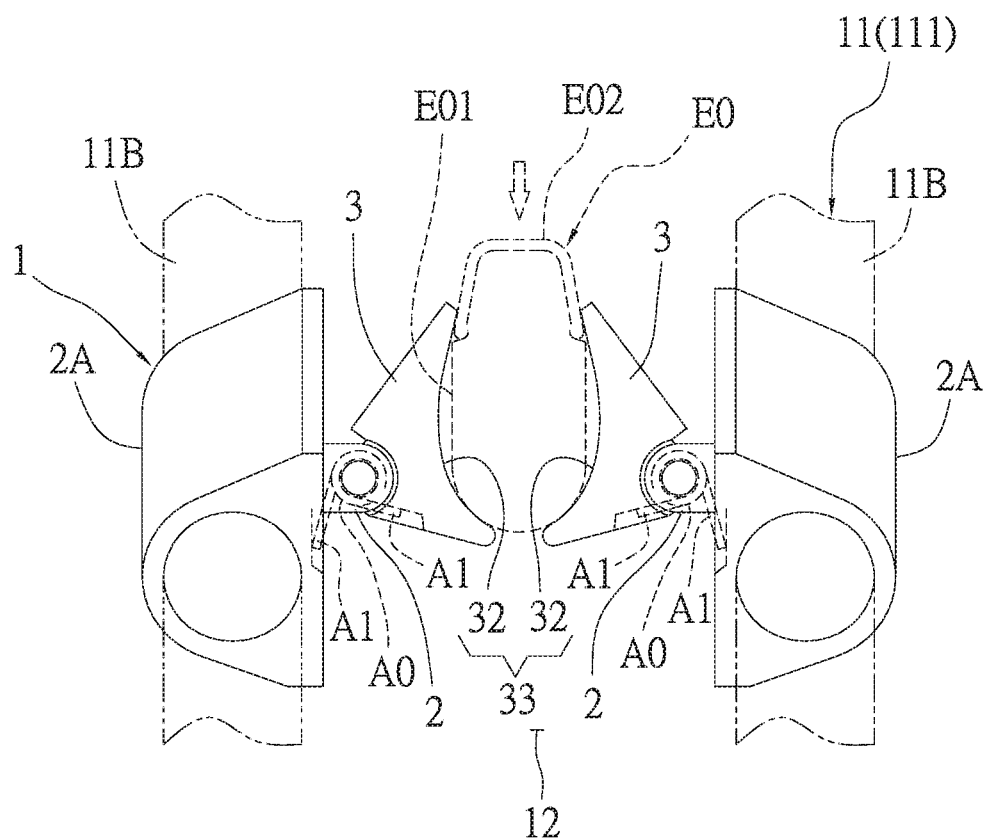
FIG. 16 is another side plan view showing the operation of a part of the erecting device of the bicycle according to the preferred embodiment of the present invention.

When a wheel E0 of a bicycle E is supported by the receiving portion 33, the bicycle E presses the arcuate face 32, as shown in FIG. 14, so that the arcuate face 32 rotatably engages with the wheel E0 and matches with the stop wheel 4C to position the bicycle E. Since the wheel E0 is rotatably engaged by the arcuate face 32, the erecting device 1 is erected without considering a size of the wheel E0, as shown in FIG. 15. As illustrated in FIG. 14, damper 3 engages with the wheels E0 of different sizes or air of a tire E01 is released, the wheel E0 presses the receiving portion 33 so that the arcuate face 32 clamps the wheel E0 and a metal rim E02 of the wheel E0, when the air of the tire E01 is released, each damper 3 engages with the wheels E0 stably, as shown in FIG. 16. The bicycle E is located at a stable position, as illustrated in FIG. 14.

Figure 10:
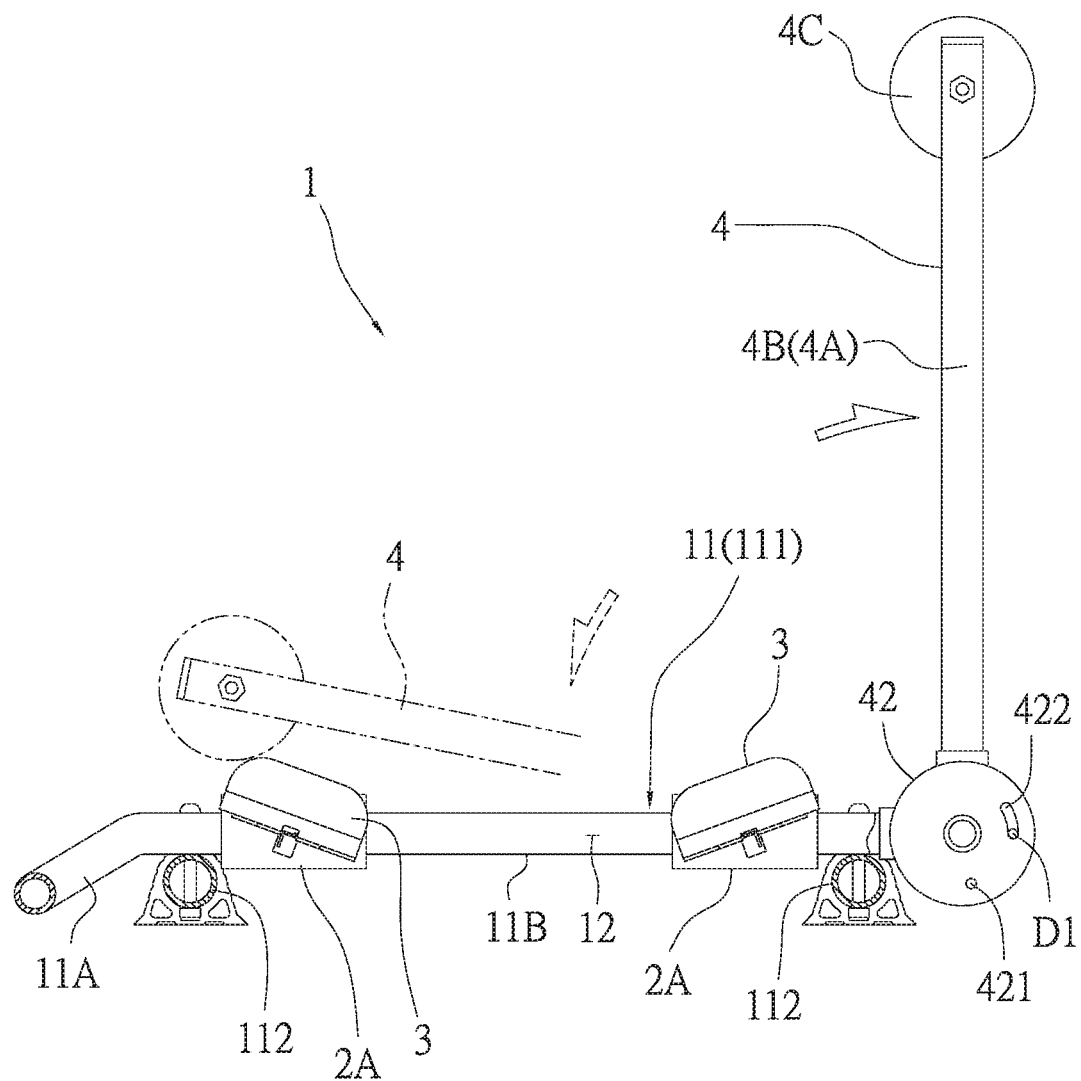
FIG. 10 is a side plan view showing the assembly of the erecting device of the bicycle according to the preferred embodiment of the present invention.

The press section D1 is located within the arcuate recess 422, slides the stop wheel 4C by mating with the size of the wheel E0, and adjustably supports the wheel E0. The stop wheel 4C supports the wheel E0, as shown in FIG. 14, a support angle of the stop wheel 4C is controlled by the rotary spring B, as shown in FIG. 13. When the swing rack 4 swings forward to retract, the press section D1 is pressed so that the swing rack 4 swings forward until the press section D1 returns to an original position to engage into the opening 421, as illustrated in FIG. 10.

The erecting device 1 rotatably engages with the wheel E0 by ways of the arcuate face 32, and the stop wheel 4C supports the bicycle E stably. Because the wheel E0 is fixed by the arcuate face 32, the erecting device 1 supports the bicycle E without considering conditions of the wheel E0.

While various embodiments in accordance with the present invention have been shown and described, it is clear to those skilled in the art that further embodiments may be made without departing from the scope of the present invention.

What is claimed is:

1. An erecting device for a bicycle comprising:
at least one mounting, at least one groove defined inside the at least one mounting, and at least one rotatable connection portion arranged inside the at least one groove and facing a ground, wherein two rotatable connection portions are parallelly arranged on each of two ends of the at least one groove, each of the two rotatable connection portions is rotatably connected with each of multiple dampers, and each clamper has a coupling portion for mating with each rotatable connection portion, wherein a fixing shaft is connected with each rotatable connection portion and the coupling portion, and the fixing shaft is inserted through a resilient element, wherein the resilient element has two first returning segments, one of the two first returning segments abuts against each rotatable connection portion, and the other first returning segment is biased against a bottom of each clamper, each clamper has an arcuate faces parallel to each rotatable connection portion and has a receiving portion formed on the arcuate face beside each of two sides of each groove, wherein the at least one mounting respectively has at least one post, a curved portion formed on an end of each of the at least one post, and two extensions parallelly extending from two ends of the curved portion respectively, two ends of the two extensions are connected with two stand tubes, and the groove is defined by the two extensions and the two stand tubes, and wherein each of the at least one mounting has a swing rack mounted on an end thereof opposite to the curved portion, each mounting has a first rotatable connector fixed on a first side thereof, and the first rotatable connector has an accommodation chamber defined in a side thereof away from each mounting, wherein the accommodation chamber has an abutting face defined on the accommodation chamber, and the accommodation chamber accommodates a rotary spring, wherein the rotary spring has a second returning segment for abutting against the abutting face, and the rotary spring also has a third returning segment opposite to the second returning segment, wherein the swing rack includes a first rotatable seat rotatably connected with the first rotatable connector and limited in the accommodation chamber, the first rotatable seat has a contact face defined on an inner wall thereof and contacting with the third returning segment, and the first rotatable seat has a first rotary part, each mounting is fixed with a second rotatable connector opposite to the first rotatable connector, wherein the second rotatable connector has a housing room configured to a compression spring and a positioning bolt, and the positioning bolt has a press section, the swing rack further includes a second rotatable seat rotatably connected with the second rotatable connector and limiting the housing room, and the rotatable seat has an opening and an arcuate recess, wherein when the swing rack swings forward, the compression spring pushes the press section of the positioning bolt via the opening, when the swing rack swings upward, the compression spring pushes the press section of the positioning bolt via the arcuate recess so that the press section slides in the arcuate recess, and each mounting forces the swing rack forward by using the third returning segment of the rotary spring so that the press section abuts against a bottom of the arcuate recess, the second rotatable seat has a second rotary part, and a stop wheel is rotatably connected between the second rotary part and the first rotary part and corresponds to a center of the groove.

2. The erecting device as claimed in claim 1, wherein four holders are connected with the two extensions within the groove, and each rotatable connection portion is arranged on each of the four holders.

* * * * *